United States Patent [19]
Arnold

[11] Patent Number: 5,845,472
[45] Date of Patent: Dec. 8, 1998

[54] HARVESTING ATTACHMENT FOR AGRICULTURAL MACHINES FOR PICKING AND TRANSPORTING STALK CROPS, IN PARTICULAR CORN PLANTS

[75] Inventor: Rudolf Arnold, Saulgau, Germany

[73] Assignee: Claas KGaA, Harsewinkel, Germany

[21] Appl. No.: 669,884

[22] Filed: Jun. 20, 1996

[30] Foreign Application Priority Data

Jun. 27, 1995 [DE] Germany ................ 195 23 255.0

[51] Int. Cl.[6] ................................................ A01D 45/02
[52] U.S. Cl. ................................................ 56/94; 56/228
[58] Field of Search ................ 56/13.4, 15.6, 56/94, 98, 119, DIG. 9, 228, 14.5, 208; 172/311, 456, 459

[56] References Cited

U.S. PATENT DOCUMENTS

| | | | |
|---|---|---|---|
| 3,258,901 | 7/1966 | Van Der Lely et al. | 56/228 |
| 3,345,808 | 10/1967 | Van Der Lely | 56/228 X |
| 4,355,690 | 10/1982 | Jensen et al. | 172/456 X |
| 4,409,780 | 10/1983 | Beougher et al. | 56/228 |
| 4,563,866 | 1/1986 | Wistüba et al. | 56/228 |
| 4,903,470 | 2/1990 | Hemker et al. | 56/228 |

FOREIGN PATENT DOCUMENTS 4002344  7/1992  Germany ................ A01D 45/02

*Primary Examiner*—Michael J. Carone
*Assistant Examiner*—Robert Pezzuto
*Attorney, Agent, or Firm*—Michael J. Striker

[57] ABSTRACT

A harvesting attachment for an agricultural machine for picking and transporting stalk crops has a central part having two sides, two side parts turnably mounted on the sides of the central part and provided with working elements, the side parts are extendable to assume a working position and movable upwardly as well as turnable inwardly to assume a transporting position for reducing a width of the harvesting attachment, so that the side parts with said working elements in the transporting position are located at least partially one above the other.

14 Claims, 5 Drawing Sheets

5,845,472

HARVESTING ATTACHMENT FOR AGRICULTURAL MACHINES FOR PICKING AND TRANSPORTING STALK CROPS, IN PARTICULAR CORN PLANTS

BACKGROUND OF THE INVENTION

The present invention relates to a harvesting attachment for agricultural machines for picking and transporting stalk crops, in particular corn plants, which has a plurality of cutting and/or transporting elements are arranged in a working position near one another on a fixed central part and on side parts turnable on the central part.

Harvesting attachments of the above mentioned general type are known in the art. One of such harvesting attachments is disclosed, for example in the German Patent Document 40 02 344. In the construction disclosed in this reference, the side parts provided with a set of cutting and transporting drums and arranged at both sides of a central part are turnable upwardly and inwardly through supporting arms for a street transportation with reduced width extension. Therefore they are located within the width of the central part above the cutting and transporting drums arranged on it. The width of the central part is substantially smaller than the street transportation width of maximum 3 meters prescribed by the regulations. This construction, however has a disadvantage that the attachment must have a working width below 6 meters. With a greater working width, the inwardly turned cutting and transporting drums located near one another can extend outwardly beyond the lateral limit of the central part and therefore over 3 meters that is not permissible.

SUMMARY OF THE INVENTION

Accordingly, it is an object of the present invention to provide a harvesting attachment to an agricultural machine of the above mentioned general type, which avoids the disadvantages of the prior art.

More particularly, it is an object of the present invention to provide a harvesting attachment for an agricultural machine, which even with a working width of substantially more than 6 meters can be converted to a position with a transporting width of below 3 meters.

In keeping with these objects and with others which will become apparent hereinafter, one feature of the present invention resides, briefly stated in a harvesting attachment for an agricultural machine, in which the side parts with outer cutting and/or transporting elements are turnable and arrestable at least partially to a transporting position so that they are located one over the other.

When the harvesting attachment is designed in accordance with the present invention, the side parts and the outer cutting and transporting elements arranged on them can have a working width equal to the width of the central part, which can compensate for an increase of the total working width of the harvesting attachment relative to a known device from 6 meters to 9 meters.

In accordance with a further feature of the present invention, the side parts can be turnably supported around axes at free ends of the supporting arm, which in the working position of the harvesting attachment extend upwardly outwardly with different inclination to the transporting direction, and the supporting arms can be supported turnably with their inner ends around an axis extending substantially in the traveling direction on the central part.

In accordance with still a further feature of the present invention, the axes at the free end of the supporting arms in the working position of the harvesting attachment can be inclined at an angle of 5°–15° and an angle of 20°–30° to the traveling direction, as well as at an angle of 10°–20° and an angle 20°–30° to a vertical plane of the harvesting attachment.

Still a further feature of the present invention is that the supporting arms can extend substantially transversely to the traveling direction, and with their axes can be located at their free end in the rear region of the central part above its lateral upper side. Both supporting arms can be supported on the central part with their inner end turnably about a common axis located substantially in the traveling direction.

In accordance with the present invention, also an agricultural machine with a harvesting attachment formed in accordance with the present invention is provided.

It should be emphasized that the harvesting attachment in accordance with the present invention is not limited to the specific type. It can be also utilized on other agricultural machines which are connected through a central part on a tractor or another pulling machine and in which side parts are turnably arranged laterally on the central part and support working tools, for example rotatably driven grinders as disclosed in the German patent document DE-OS 43 22 263.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
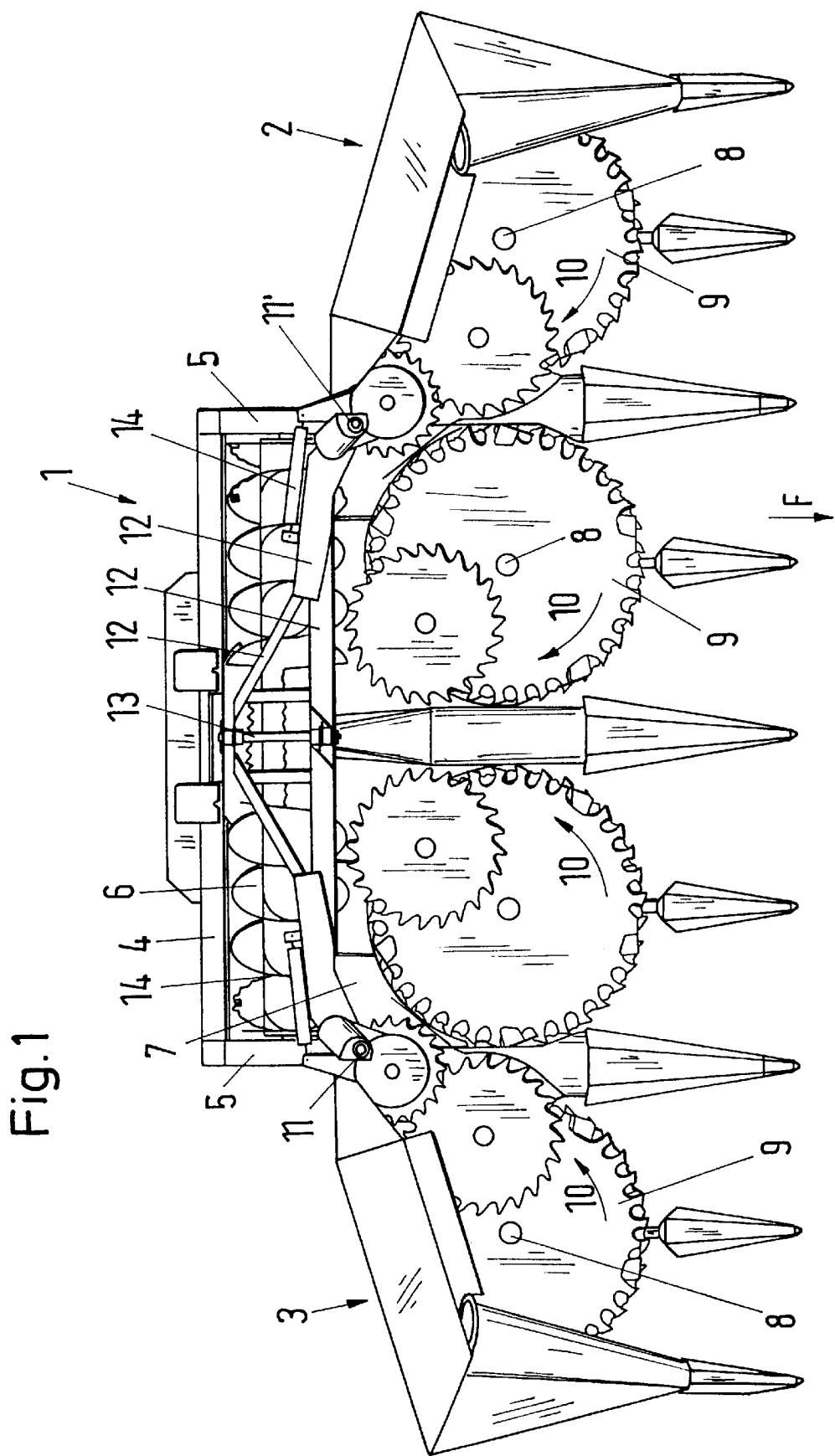
FIG. 1 is a view showing a three-part harvesting attachment for corn plants on a plan view and in a working position, in accordance with the present invention.

A harvesting attachment to an agricultural machine described here as an example is a harvesting attachment which is used for harvesting corn plants standing on a field. It is composed of three parts including a stationary central part 1 and two side parts 2 and 3 which are turnably arranged at both sides on the central part. The central part 1 is formed as a trough 4 which is open forwardly as considered in a traveling direction F. A rear side of the trough is connected with a not shown transporting shaft with transporting rollers operating for transporting the picked up corn plants to a subsequent harvesting machine.

The trough 4 has side walls 5, and a transverse transporting conveyer screw 6 is rotatably supported in the side walls 5. The trough 4 also has a trough bottom 7. Cutting (mowing) and transporting elements 9 are mounted on the bottom 7 on substantially vertically extending shafts 8 so as to rotate in direction of the arrow 10. They can be composed for example of cutting disks and transporting disks which are arranged coaxially to the cutting disks and provided with transporting fingers. Similar cutting and transporting elements 9 are rotatably supported on the bottom of the side parts 2 and 3. The driving of the transverse transporting conveyer screw 6 as well as of the cutting and transporting elements 9 is performed in a not shown manner through a drive train from a power source of the subsequent agricultural machine.

The side parts 2 and 3 are turnably supported on axles 11 and 11' on free ends of supporting arms 12, for example through hydraulic cylinder-piston units 14. The supporting arms 12 are arranged with their inner ends turnably in a vertical direction about an axis 13 which extends in a traveling direction in the upper region of the trough 4, for example via a hydraulic cylinder-piston unit 15. The hydraulic cylinder-piston units 14 are supported on the supporting arms 12, while the hydraulic cylinder-piston unit 15 are supported on the central part 1. The axles 11 and 11' on the free end of the supporting arms 12 extend in the working position of the harvesting attachment with different angles inclinedly to the traveling direction F upwardly, so that they form an angle $\alpha$ of substantially 10° and an angle $\alpha'$ of substantially 25° to the traveling direction F as shown in FIG. 2 as well as an angle $\beta$ of substantially 15° and an angle $\beta'$ of substantially 25° to the vertical plane of the harvesting attachment as shown in FIG. 3.

Figure 2:
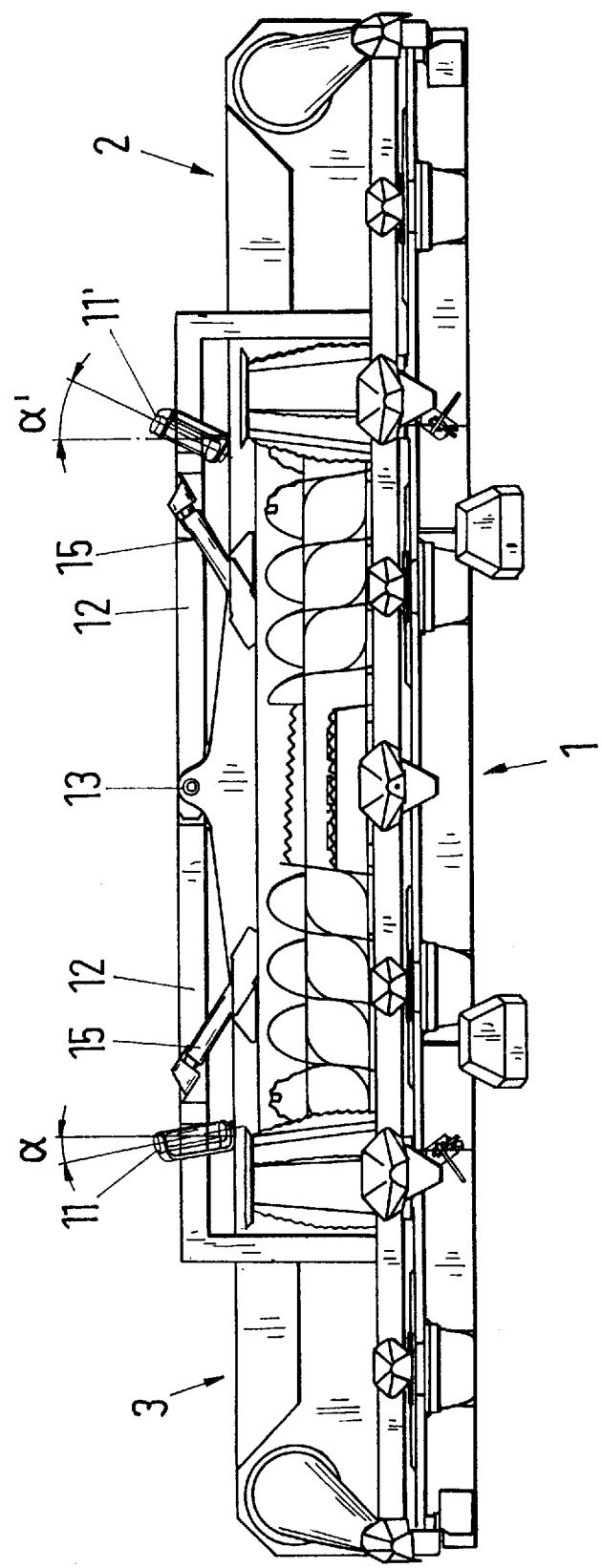
FIG. 2 is a view of the harvesting attachment for corn plants as seen from the front, in accordance with the present invention.
Figure 3:
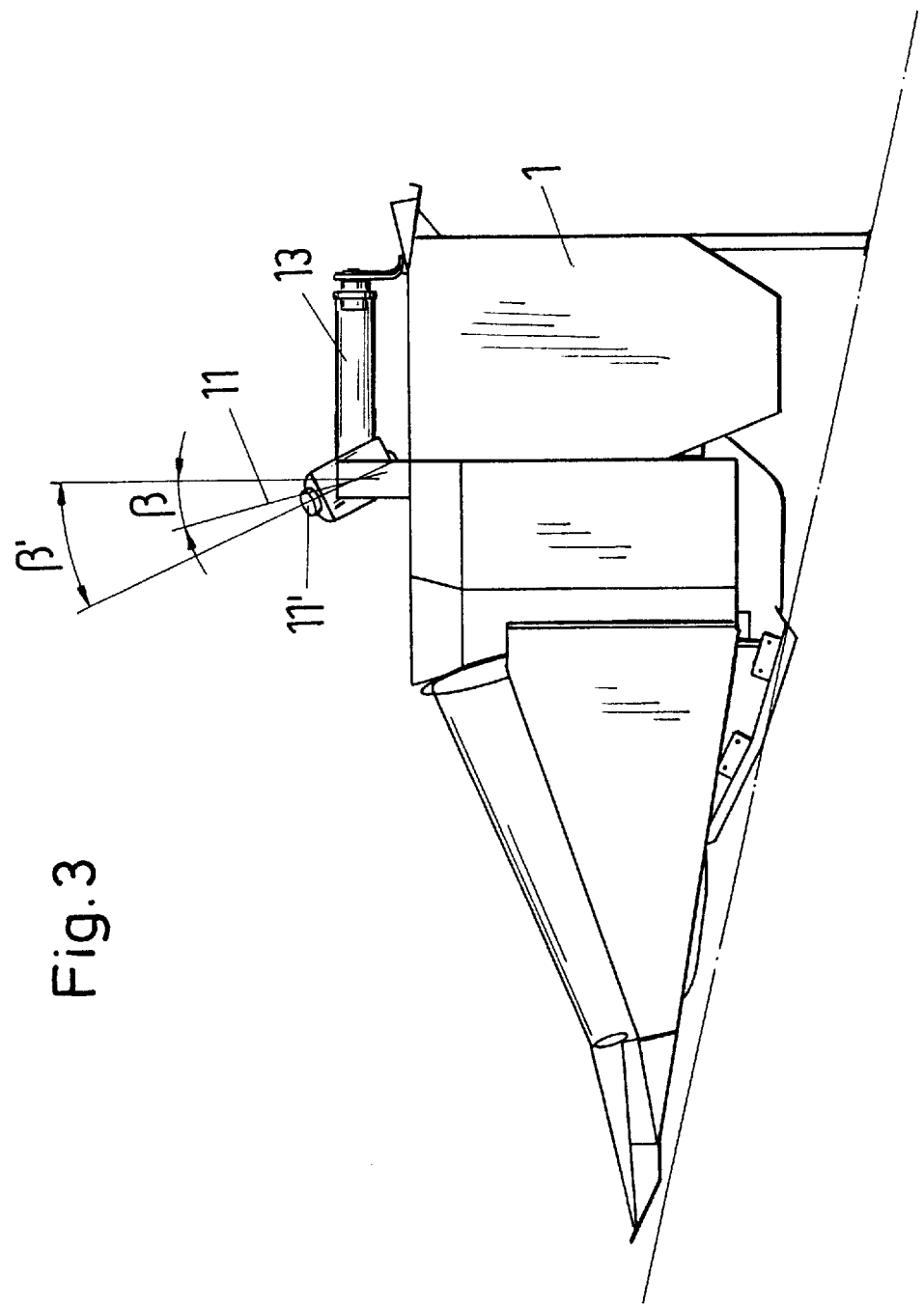
FIG. 3 is a side view of the inventive harvesting attachment for corn plants.
Figure 4:
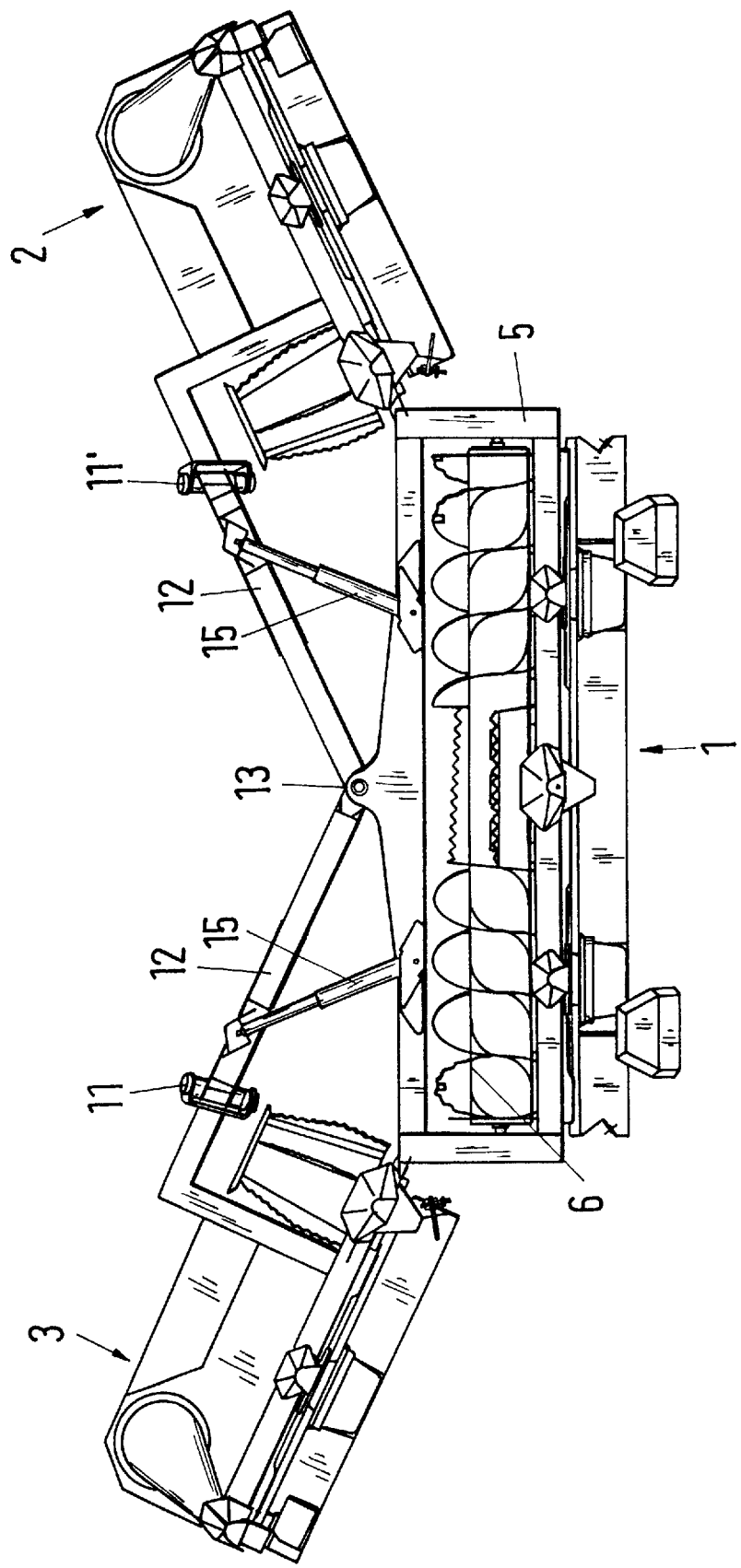
FIG. 4 is a view showing the harvesting attachment of FIG. 2 with a side part which is turned upwardly to a transporting position.
Figure 5:
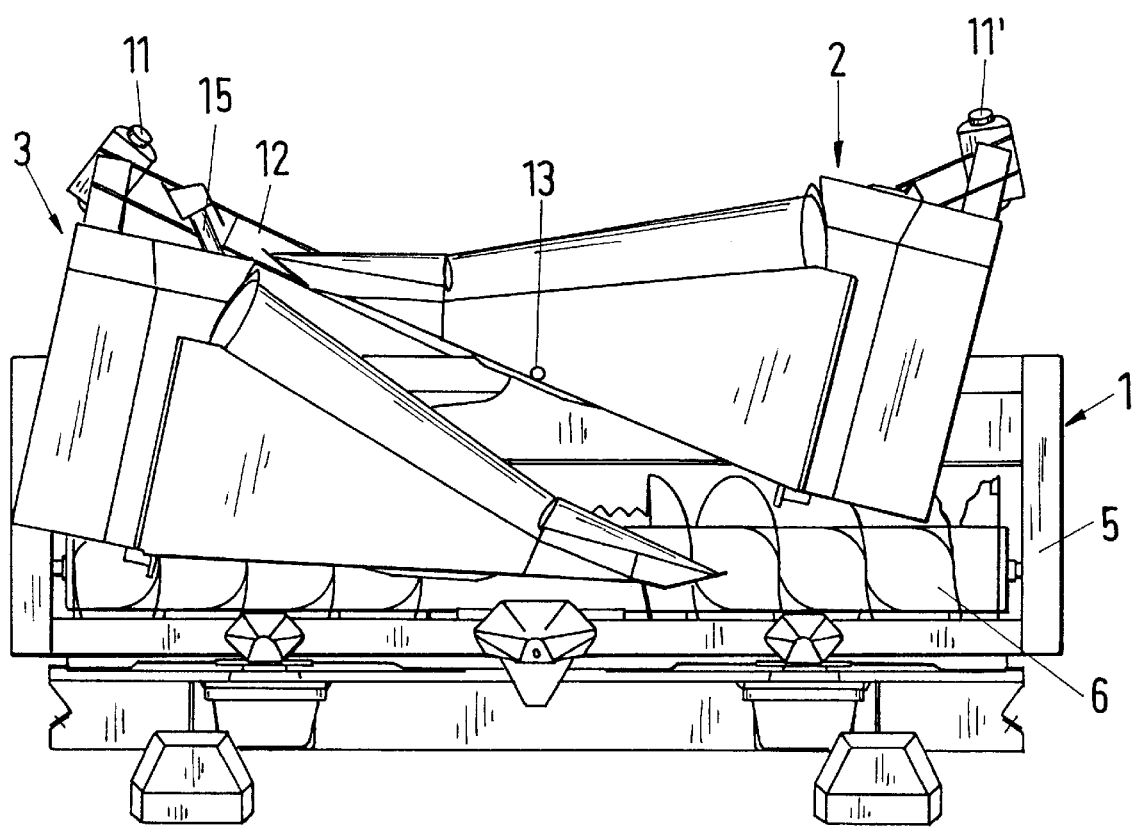
FIG. 5 is a view showing a harvesting attachment of FIG. 2 with an inwardly turned side part.

In the working position of the harvesting attachment in accordance with the present invention, the side parts 2 and 3 with their cutting and transporting elements are supported in a not shown manner laterally on the central part 1 and locked if necessary, as shown in FIGS. 1 and 2. For a transporting position, the supporting arms 12 with the side parts 2 and 3 supported on their outer ends are turned upwardly by the hydraulic cylinder-piston units 15 to a position shown in FIG. 4. After this, the side parts 2 and 3 are turned inwardly by the hydraulic cylinder-piston unit 14 about the axles 11 and 11' so as to assume the position shown in FIG. 5. The side parts 2 and 3 are therefore located partially over one another above the central part 1 because of the different inclination of their turning axles 11 and 11'. As a result they can have a width which is substantially greater than the half width of the central part 1.

It will be understood that each of the elements described above, or two or more together, may also find a useful application in other types of constructions differing from the types described above.

While the invention has been illustrated and described as embodied in harvesting attachment for agricultural machines for picking and transporting stalk crops, in particular corn plants it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvesting attachment for an agricultural machine for picking and transporting stalk crops, comprising a central part having two sides and provided with working elements; two side parts turnably mounted on said sides of said central part and provided with working elements, said side parts being extendable to assume a working position and movable upwardly as well as turnable inwardly to assume a transporting position for reducing a width of the harvesting attachment, so that said side parts with said working elements in said transporting position are located at least partially one above the other directly above said working elements of said central part and are partially inserted in one another.

2. A harvesting attachment as defined in claim 1, wherein said working elements are formed as elements selected from the group consisting of cutting elements, transporting elements and both cutting and transporting elements.

3. A harvesting attachment as defined in claim 1, wherein said working elements include cutting and transporting drums which are rotatable about axes oriented toward a ground.

4. A harvesting attachment as defined in claim 1; and further comprising means for mounting said side parts on said central parts so that said side parts are vertically displace able and inwardly turnable from said working position to said transporting position.

5. A harvesting attachment as defined in claim 4, wherein said mounting means include supporting arms having free ends, said side parts being supported on said free ends of said supporting arms turnably about two axles, which in the working position of the attachment being inclined upwardly outwardly relative to a traveling direction with different angles and are supported on said central part with axle inner ends turnably about an axis located substantially in the traveling direction.

6. A harvesting attachment as defined in claim 5, wherein the axles on said free ends of said supporting arms in the working position are inclined by angles of 5°–15° and 20°–30° correspondingly to the traveling direction, and also are inclined by angles of 10°–20° and 20°–30° correspondingly to a vertical plane upwardly and outwardly.

7. A harvesting attachment as defined in claim 1; and further comprising means for mounting said side parts on said central part vertically displaceably and inwardly turnably and including supporting arms which extends substantially transversely to a traveling direction and have free ends with axles arranged in a rear region of said central part above a lateral upper side.

8. A harvesting attachment as defined in claim 4, wherein said supporting arms have inner ends supported on said central part turnably about a joint axle extending substantially in a traveling direction.

9. An agricultural machine, comprising a machine part; and a harvesting attachment connected with said machine part, said harvesting attachment including a central part having two sides and provided with working elements, two side parts turnably mounted on said sides of said central part and provided with working elements, said side parts being extendable to assume a working position and movable upwardly as well as turnable inwardly to assume a transporting position for reducing a width of the harvesting attachment, so that said side parts with said working elements in said transporting position are located at least partially one above the other directly above said working elements of said central part and are partially inserted in one another.

10. An agricultural machine as defined in claim 9, wherein said working elements of said harvesting attachment are formed as elements selected from the group consisting of cutting elements, transporting elements and both, said working elements including cutting and transporting drums which are rotatable about axes oriented toward a ground.

11. An agricultural machine as defined in claim 9; and further comprising means for mounting said side parts on said central parts so that said side parts are vertically displaceable and inwardly turnable from said working position to said transporting position.

12. An agricultural machine as defined in claim 11, wherein said mounting means include supporting arms having free ends, said side parts being supported on said free ends of said supporting arms turnably about two axles, which in the working position of the attachment being inclined upwardly outwardly relative to a traveling direction with different angles and are supported on said central part with axle inner ends turnably about an axis located substantially in the traveling direction.

13. An agricultural machine as defined in claim 12, wherein said supporting arms extend substantially transversely to the traveling direction, while said side parts extend in the working position with longitudinal axes of said side parts substantially parallel to said supporting arms.

14. An agricultural machine as defined in claim 12, wherein said supporting arms have inner ends which are supported on said central part turnably about a joint axle extending in the traveling direction.

\* \* \* \* \*